April 23, 1940.  R. L. SMYTHE  2,198,093
DEAD END CABLE CLAMP
Filed April 28, 1937  2 Sheets-Sheet 2
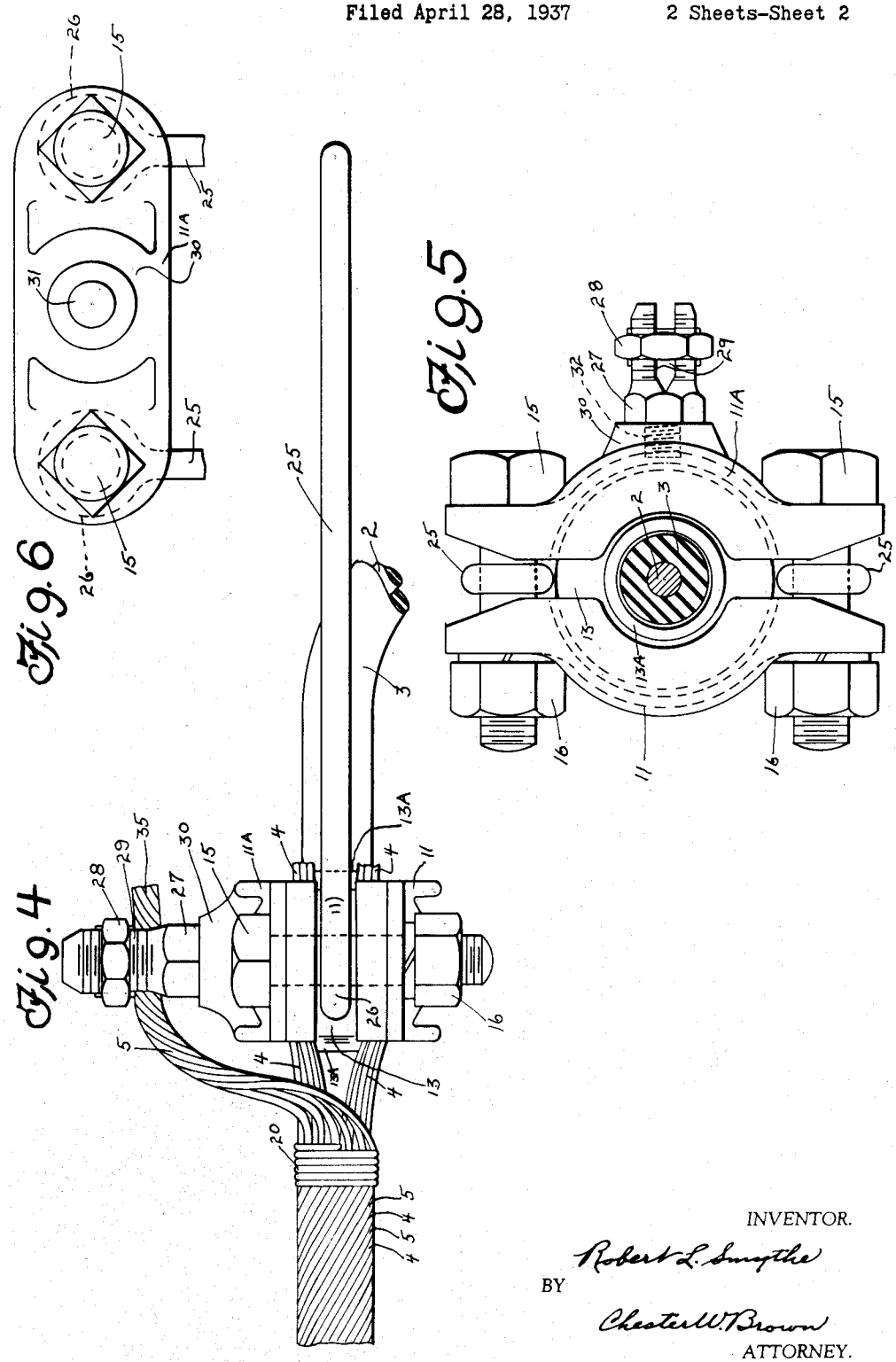
INVENTOR.
Robert L. Smythe
BY
Chester W. Brown
ATTORNEY.

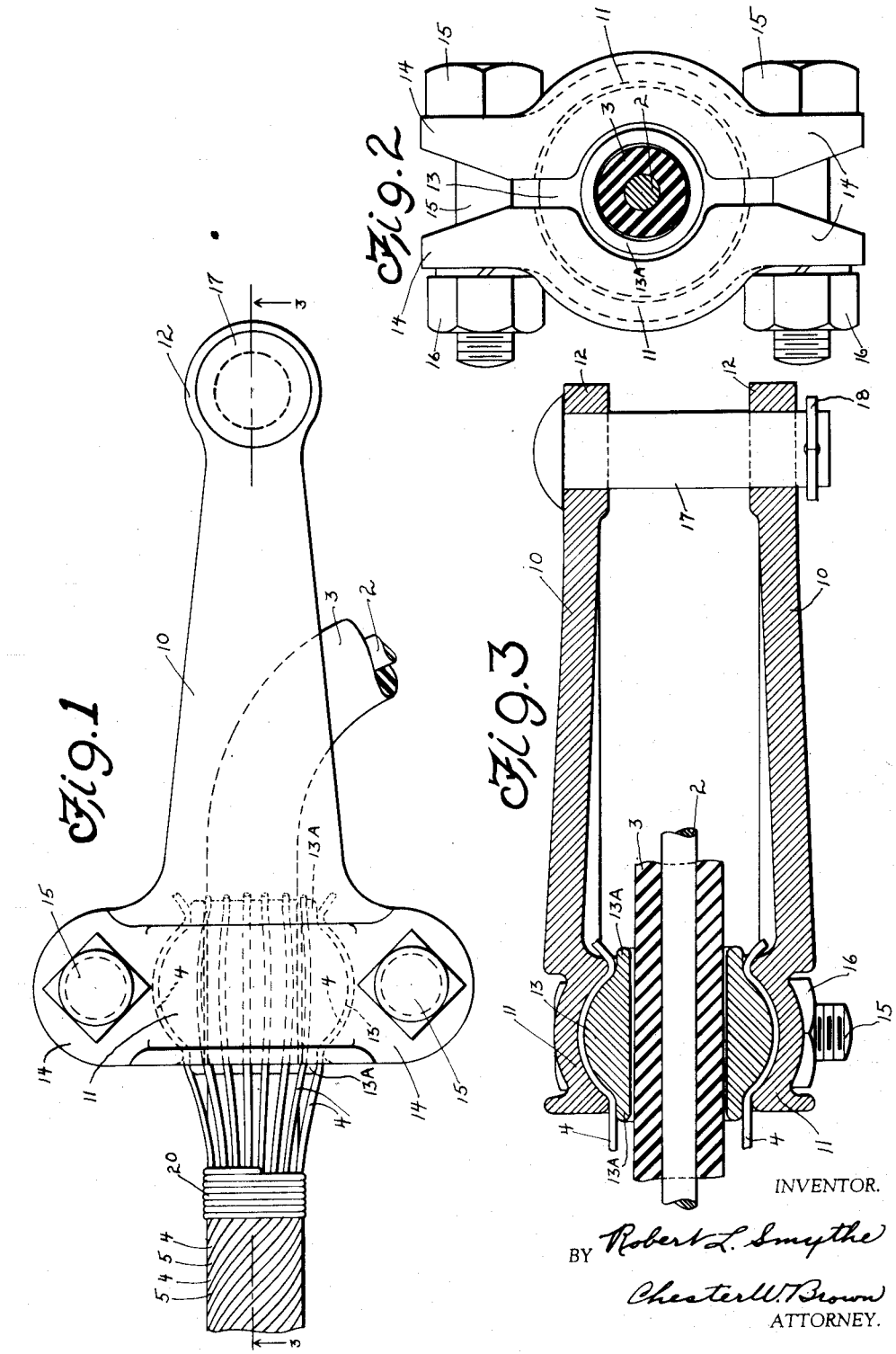

Patented Apr. 23, 1940

2,198,093

UNITED STATES PATENT OFFICE 2,198,093

DEAD END CABLE CLAMP

Robert L. Smythe, Milwaukee, Wis., assignor to Line Material Company, South Milwaukee, Wis., a corporation of Delaware Application April 28, 1937, Serial No. 139,465

9 Claims. (Cl. 174—79)

This invention relates to improvements in dead end cable clamps.

The improved dead end cable clamp hereafter described is particularly devised for use in connection with concentric transmission electric cables comprising a conducting copper core wire, an insulating cover therefor, and a conducting sheath of a plurality of wires wound about the insulating cover, these wires being alternately composed of copper and steel.

An object of this invention is to provide a dead end cable clamp designed to receive and anchor the terminal end of a concentric cable by engaging at least a portion of the sheath wires in concentric relation to the core and thereby securely holding the cable without strain upon the core.

More specifically, it is an object to provide an anchorage means for the terminal portion of a concentric cable designed to hold the insulated copper core portion of the cable in a position free of all clamping action and strain and anchoring the cable solely by means of the steel wires.

Another object is to provide a dead end cable clamp for a concentric cable having a terminal post adapted to receive the copper wires from the sheath for connection with a lead of wire.

In the drawings:

Fig. 1 is a top plan view of a device embodying my invention.

Fig. 2 is an end view of the device as seen from the left relative to Fig. 1.

Fig. 3 is a sectional view in side elevation taken along the line 3—3 of Fig. 1.

Fig. 4 is a view in side elevation showing a modified form of this invention.

Fig. 5 is a view of the device as seen from the left relative to Fig. 4.

Fig. 6 is a top plan view of the Fig. 4 device with a portion removed.

Like parts are designated by the same reference characters throughout the several views.

The concentric cable is composed of a core of copper wire 2, an insulating covering 3 and a sheath of alternate steel and copper wires 4 and 5, respectively, wound helically about the periphery of the insulation 3.

The dead end clamp shown in Figs. 1, 2 and 3 comprises a pair of cruciform clamping elements 10, each having a spherically dished clamping jaw 11 and an apertured strain arm 12, a centrally apertured clamping ring 13 having its outer periphery of spheroidal shape complementary to the shape of the dished clamping jaw, clamping bolts 15 extending through the laterally projecting ears 14 on the jaws 11, nuts 16 cooperating with the bolts, and a strain pin 17 connecting the apertured ends of the arms 12 and held in position by means of the cotter pin 18.

In the structure disclosed in Figs. 1, 2 and 3, the cable is attached in the following noted manner. The ends of the steel wires 4 of the sheath are separated from the copper wires 5, at least one of the steel wires being wound about the sheath as shown at 20 in Fig. 1, thereby guarding the ends of the copper wires and preventing unraveling thereof. Then the elements 10 are disconnected at the wire-receiving end of the clamp by removal of the bolts 15 thereby to permit separation of the elements 10 from the ring 13. When the clamp has thus been disassembled, the ring is passed over the conductor 2 and its insulation 3 and the wires 4 are disposed uniformly about the ring 3.

After the wires 4 have been disposed about the ring, the clamping elements 10 are assembled over the ring and the wires and drawn into clamping engagement therewith by means of the bolts 15 and nuts 16. Fig. 3 clearly shows how the clamp bends the wires 4 arcuately about the spheroidal surface of the ring. Since the ring 13 does not transmit clamping forces to the conductor 2 or its insulation 3, all of the strain produced by the cable will be transmitted directly through the steel wires 4 to the clamp.

It will be obvious that the outer periphery of the ring 13 and the corresponding curvature of the clamping jaws 11 may be cylindrical, but it is preferred to make them as shown, for the reason that a given clamping force exerted upon the wires is more effective in holding them against withdrawal. Preferably the ring 13 is extended cylindrically at each end 13A to provide a boss which will prevent the wires 4 from contacting the insulation 3 on the cable and possibly injuring it.

The cable anchoring device previously described is supported by means of the pin 17 from an insulating support not shown. As indicated in Fig. 3, the arms 12 are spaced apart and permit the conductor 2 with its insulation 3 to be extended from the clamp in the manner shown in Fig. 1 for connection with a lead-off wire not shown. Obviously the sheathing may be connected in any suitable manner (not shown) with a lead-off wire (not shown).

The modification shown in Figs. 4, 5 and 6 is the same as to the actual clamping structure as that previously described. In this modified form, the clamping ring 13 is identical and the clamping jaws 11 and 11A are provided with spherical depressions conforming to the curvature of the ring. However, in this modified form the jaws 11 and 11A are not provided with strain arms as in the Fig. 1 structure. Instead, a wire bail 25 is provided with its ends bent to provide eyes 26 receiving the bolts 15.

As shown, the clamping element 11A is provided with a split bolt connector 27 having a clamping nut 28 which carries a clamping jaw 29 slidable between the legs of the bolt. The jaw 11A is provided with a centrally located boss 30 which is provided with a threaded aperture 31 which is shown in Fig. 6. The split bolt 27 is provided with a threaded shank 32 shown in broken lines in Fig. 5 and is threaded into the aperture 31. Thus the bolt 27 may be attached to the jaw 11A when it is desired for use as subsequently will appear.

The modified cable anchoring device is secured to the concentric cable in much the same manner as described with reference to the device disclosed in Figs. 1 to 3, inclusive. The steel wires 4 of the sheath are clamped between the ring 13 and the jaws 11 and 11A. However, in the modified structure the copper wires 5 of the sheath are gathered into a group and twisted together to form a terminal portion 35 which is disposed in the split bolt 27 where it may be connected with a lead-off wire (not shown) and clamped thereto by means of the nut 28 and clamping jaw 29.

In order to hold the sheath wires 4 and 5 upon the periphery of the insulation 3 of the cable, one of the steel wires is wound about the sheath at 20. The core 2 and its insulation 3 is projected from the anchoring device and between the arms of the bail 25 to afford connection therewith of a lead-off wire. The bail 25 will be connected with an insulating support, not shown, when the cable is being supported by the anchoring device.

From the foregoing disclosure, it becomes apparent that a cable anchoring device is provided for dead ending a concentric cable and that all of the strain produced by the cable when suspended is imposed upon the steel wires of the sheath and not upon the more ductile copper wires of the cable.

It will also be apparent that an anchoring device for concentric cable has been provided which may be cheaply manufactured, is easy to connect to a cable, and is efficient in operation.

I claim:

1. A dead end clamp for concentric cable, said clamp comprising a pair of concavely curved clamping jaws, an apertured pressure element disposed between said jaws and having a convexly curved periphery complementary to said jaws, substantially parallel relatively spaced means on opposite sides of said aperture for clamping said jaws relative to said element, strain arms each secured to a portion of a clamping jaw intermediate said means and extending from a clamping jaw and provided with an aperture remote therefrom, and a strain pin extending through the apertures in said arms.

2. A dead end clamp for concentric cable, said clamp comprising a pair of clamping jaws, each having a pair of apertured ears, a pressure element between said jaws, a pair of substantially parallel relatively spaced arms each secured to a portion of a clamping jaw intermediate said ears and extending from one of said jaws intermediate said ears and each being apertured remote from said jaws, clamping bolts engaged in the apertures of adjacent ears of said jaws for clamping said jaws relative to said element, and a strain pin disposed in the apertures in said arms.

3. A dead end cable clamp for concentric cable, said clamp comprising a pair of clamping jaws, each having a strain arm, means connecting said arms remote from said jaws, each of said jaws having a spheroidal clamping cavity, an apertured pressure ring between the cavities of said jaws and having a spheroidal periphery cooperating with said cavities, and means for clamping said jaws relative to said ring, said ring having at each end of said aperture a boss surrounding the aperture and extended a distance beyond the clamping cavities of said jaws.

4. The combination with a concentric electric cable comprising a conducting core wire, an insulating covering on said core wire, and a sheathing on said covering comprising a plurality of relatively parallel wires wound spirally about said covering; of a dead end cable clamp comprising an apertured pressure ring mounted on said insulating covering, at least a portion of said parallel wires being extended over the outer periphery of said ring in the same direction of the cable through said ring, a pair of clamping jaws clamping said portion of said parallel wires to said pressure ring and being movable radially relative to said ring, means releasably holding said jaws in clamping position, and means for suspending said cable clamp from an insulating support.

5. The combination with a concentric electric cable comprising a conducting core wire, an insulating covering on said core wire, and a sheathing on said covering comprising a plurality of relatively parallel wires wound spirally about said covering; of a dead end cable clamp comprising an apertured pressure ring mounted on said insulating covering, at least a portion of said parallel wires being extended over the outer periphery of said ring, a pair of clamping jaws clamping said portion of said parallel wires to said pressure ring, means holding said jaws in clamping position, means for suspending said cable clamp from an insulating support, and connector means on one of said jaws, the portion of said parallel wires not clamped to said ring being gathered into said connector means for electrical connection with a lead-off wire.

6. The combination with a concentric electric cable comprising a conducting core wire, an insulating covering on said core wire, and a sheathing on said covering comprising a plurality of relatively parallel wires wound spirally about said covering; of a dead end cable clamp comprising an apertured pressure ring mounted on said insulating covering, at least a portion of said parallel wires being extended over the outer periphery of said ring, a pair of clamping jaws clamping said portion of said parallel wires to said pressure ring, means holding said jaws in clamping position, means for suspending said cable clamp from an insulating support, and connector means on one of said jaws, the portion of said parallel wires not clamped to said ring being gathered into said connector means for electrical connection with a lead-off wire, said core wire being projected through said ring for connection with a lead-off wire.

7. A dead end clamp in combination with a concentric cable including an insulated core wire and a plurality of sheathing wires wound about the insulated core wire, said clamp comprising a clamping ring having a wire-receiving aperture and an outer clamping surface disposed about said aperture, clamping means disposed about and complementary to the outer periphery of said ring, said insulated core wire being freely disposed in said aperture and said sheathing wires being clamped by said clamping means to the outer periphery of said ring, and means for drawing said clamping means into clamping engagement with said ring, said ring being extended circumferentially about said cable and beyond said clamping means, whereby to hold said wires from contact with said insulating covering.

8. A dead end clamp in combination with a concentric cable including an insulated core wire and a plurality of sheathing wires wound about the insulated core wire, said clamp comprising a clamping ring having a wire-receiving aperture and a spheroidal clamping surface disposed about the aperture, clamping means disposed about and complementary to the said outer clamping surface, said insulated core wire being freely disposed in said aperture and said sheathing wires being clamped by said clamping means to said clamping surface, means on opposite sides of said cable operatively clamping said clamping means, and suspension means on said clamp extending in longitudinal relation to said cable and including a swivel mounting, said aperture being unobstructed by said clamping means and suspension means.

9. A dead-end clamp in combination with a concentric cable including an insulated core wire and a plurality of sheathing wires, said clamp comprising an integrate clamping ring having a cable-receiving aperture and a spheroidal clamping surface, and clamping jaws disposed about and complementary to said surface, whereby said insulated core wire is freely disposed in said aperture and said sheathing wires are clamped by said clamping means to said surface.

ROBERT L. SMYTHE.